Aug. 11, 1959   W. T. READ, JR   2,899,652
HIGH FREQUENCY NEGATIVE RESISTANCE DEVICE
Filed June 24, 1954   5 Sheets-Sheet 1

INVENTOR
W. T. READ, JR.
BY D. H. Wilson, Jr.
ATTORNEY

Aug. 11, 1959          W. T. READ, JR          2,899,652
HIGH FREQUENCY NEGATIVE RESISTANCE DEVICE
Filed June 24, 1954                    5 Sheets-Sheet 2

INVENTOR
W. T. READ, JR.
BY D.H. Wilson, Jr.
ATTORNEY

Aug. 11, 1959   W. T. READ, JR   2,899,652
HIGH FREQUENCY NEGATIVE RESISTANCE DEVICE
Filed June 24, 1954   5 Sheets-Sheet 5

INVENTOR
W. T. READ, JR.
BY
*W.H. Wilson, Jr.*
ATTORNEY

United States Patent Office 2,899,652
Patented Aug. 11, 1959

2,899,652

HIGH FREQUENCY NEGATIVE RESISTANCE DEVICE

William T. Read, Jr., Summit, N.J., assignor to Bell Telephone Laboratories, Incorporated, New York, N.Y., a corporation of New York Application June 24, 1954, Serial No. 438,917

14 Claims. (Cl. 333—80)

This invention relates to semiconductive translators and more particularly to negative dynamic resistance devices of the type disclosed in the application of W. Shockley, Serial No. 333,449, filed January 27, 1953, now Patent No. 2,794,917.

In the aforenoted Shockley application a semiconductive structure is disclosed wherein at certain frequencies of applied voltage the current flowing therein is shifted in phase with respect to the voltage to an extent that power is delivered from a source of direct current to the alternating signal. This phase shift is realized by Shockley by a delay in the transit of charge through a portion of a semiconductive structure. Charge carriers, electrons, or holes, i.e., electron deficits, were injected in these devices, for example from a forward biased $n$-$p$ junction, and then flowed across a space charge region or a composite region consisting of a portion in which carrier flow is by diffusion and a space charge region.

The present invention is directed to semiconductive, transit-time, negative dynamic resistances of structural forms other than those disclosed by Shockley wherein charge carriers are injected into the region where the phase shift of current with respect to applied signal voltage is effected by the mechanism of electric field generation of hole-electron pairs.

An object of this invention is the realization of a negative dynamic resistance at frequencies of at least the decimeter range of wavelengths.

Another object of this invention is to localize the field generation of charge carriers in a space charge region of a semiconductive body.

Another object of this invention is to fix the distance to the edges of the space charge region from the point of localized field generation.

Other objects are to simplify the structure of semiconductive negative impedances and to facilitate their coupling to suitable circuits for the utilization of their characteristics.

In accordance with the above objects, one feature of this invention resides in subjecting a portion of a semiconductive body to a field of sufficient magnitude to generate hole-electron pairs. The carriers generated by this field are caused to flow across a space charge region adjacent their source and by virtue of this movement produce a current in an associated external circuit. An alternating signal voltage is superposed on a suitable bias such that carriers are generated at the peak of the signal and flow through a space charge region over an interval in excess of one half the signal cycle so that a net current flows out of phase with the signal and delivers power from the bias source to the alternating signal.

Another feature resides in controlling the width of and the field in the space charge region of the device through which charge carrier transit time is critical such that the transit time is substantially constant. This is accomplished by providing the device with a space charge region of substantially fixed width and range of fields in the region of critical flow of a magnitude in which charge carrier velocity is independent of field intensity.

An additional feature of this invention resides in localizing the field generation of charge carriers to a portion of the space charge region adjacent one of its limits whereby one type of charge carrier flows along a short path in the space charge region with essentially no transit time therein while the other type of charge carrier flows along a path of such length that the transit time therein is sufficient to produce a current which produces negative dynamic resistance.

A further feature resides in associating a negative impedance with a suitable impedance to produce a circuit which is tuned at the operating frequency of the negative impedance by mounting a semiconductive diode constructed in accordance with this invention in a resonant cavity and coupling the cavity to a transmission line.

One embodiment of a negative dynamic resistance to be discussed in more detail below comprises a diode semiconductive translating device having a reverse biased rectifying barrier. A portion adjacent one edge of the space charge region associated with the reverse biased barrier is arranged to contain the maximum field within the entire region. The width of the space charge region on the side of that maximum field portion opposite said one edge is of substantially fixed dimensions throughout the operation of the device. In operation, the device is biased so that the maximum field is somewhat below that necessary for hole-electron pair generation and a signal voltage is superimposed on this bias. The magnitude of the signal voltage is chosen so that during a portion of the bias aiding signal swing the critical field for hole-electron generation is exceeded and a burst of charge is caused to flow into the portion of the space charge region of substantially fixed width. The period of the applied voltage, the velocity of the charge carriers in the space charge region, and the width of the space charge region are so chosen that the current generated by the signal voltage and flowing in the external circuit exhibits a net flow out of phase with the signal voltage and results in a negative integrated product of signal voltage and current, i.e., a dynamic negative resistance. In an ideal device wherein charge carriers are generated only at the peak of the bias aiding signal cycle, at time $$\frac{\pi}{2\omega}$$

where $\omega$ is angular frequency of the signal, and the path length and velocity of charge carriers in the space charge region is fixed, dynamic negative resistance will be realized when the transit time of the charge carriers from the point of generation to the edge of the space charge region falls between $$\frac{n\pi}{\omega}$$

and $$\frac{(n+1)\pi}{\omega}$$

where $n$ is an odd integer. Negative resistance is a maximum under these ideal conditions when the transit time is $$\frac{3\pi}{2\omega}$$

The width of the space charge region is fixed as described above by providing a zone in the semiconductive body adjacent the rectifying barrier wherein the material contains a balance or a near balance of donor and acceptor centers whereby the material is either intrinsic or nearly so.

Localization of the portion of the semiconductive body in which the maximum field is produced is effected in a number of embodiments by providing an n-p barrier wherein that side of the barrier immediately adjacent the zone containing a near balance of donor and acceptor centers comprises a zone containing a large predominance of conductivity-type determining or fixing centers, i.e., acceptors or donors, and which is of the order of 0.1 mil thick. This localization can also be realized by establishing a region in the body in which there is a graded concentration of conductivity-type determining centers so that the fields therein vary in accordance with the concentration. When the maximum field is sought adjacent an n-p junction to the left of the region the predominance of the majority centers is made greatest at that point.

A number of configurations are shown wherein the semiconductive body consists of four contiguous zones, a first zone of one conductivity type, a second thin zone of the opposite conductivity type wherein the charge carriers are generated, a third zone containing a near balance of centers, and a fourth zone of the conductivity type opposite the first zone. The junction between the first and second zones is reverse biased so that the space charge region extends across the second and third zones and only slightly into the high conductivity first zone. Negative dynamic resistance is realized by the flow of field generated majority carriers from the second zone across the space charge region of the third zone and into the fourth zone over an interval producing the phase shift in current required. Those field generated carriers of the opposite type are drawn out of the space charge region and into the first zone after flowing over a distance which is very short relative to the width of the third zone.

In the embodiments discussed below electron flow over a long path in the space charge region is employed to effect the negative dynamic resistance; however, it is to be understood that hole flow could also be employed in accordance with this invention by establishing a narrow space charge region intermediate the localized source of carriers and the n-type material and a wide space charge region intermediate the p-type zone and the carrier source. Further, the transit time of both electrons and holes can be utilized in obtaining a negative dynamic resistance by so positioning the source of field generated charge carriers with respect to the space charge region boundaries that both types of carriers have the same transit time in the region and that transit time is such that the resulting current flow is on the average in opposition to the signal voltage.

The invention together with the above and other objects and features will be more fully understood from the following detailed description when read with the accompanying drawings in which:

Fig. 18 is a plot of the quantity $$\frac{\epsilon}{1+\epsilon}\frac{V_d}{V_a}$$

where $\epsilon$ is the efficiency of the unit as a negative resistance, i.e., the ratio of signal power delivered to direct current power dissipated, against the time in the period of the voltage applied to the devices of Figs. 3A, 4A, 5A, and 6A when the field generation of charge carriers is initiated;

Negative dynamic resistance can be realized in accordance with this invention by the phase shift between current and voltage due to the transit of field generated charge carriers across a space charge region. Two criteria should be met, the field should be so distributed that hole-electron pairs are generated in a limited region, and the charge carriers should move through the space charge region with an average transit time such that the net current voltage product is negative. This second criterion requires that the average charge carrier transit time in the space charge region be greater than one-half cycle and less than one cycle for the case where carriers are generated only at the maximum of the bias aiding signal swing. Under these conditions maximum negative resistance is obtained when the average transit time in the space charge region is three-quarters of a cycle.

Figure 1:
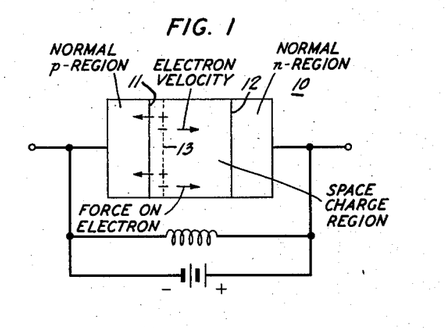
Fig. 1 is a simplified diagram of a semiconductive diode having a reverse biased n-p junction, showing the space charge region wherein the mechanisms providing negative dyamic resistance in accordance with this invention arise.
Figure 2:
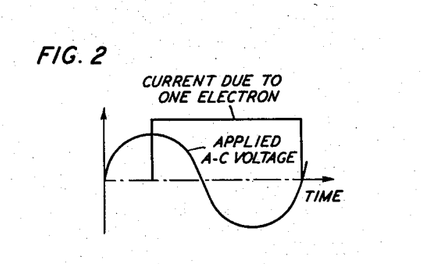
Fig. 2 shows idealized current and voltage relationships plotted against time as they are obtained with devices of this invention when operated to produce negative dynamic resistance.
Figure 15A:
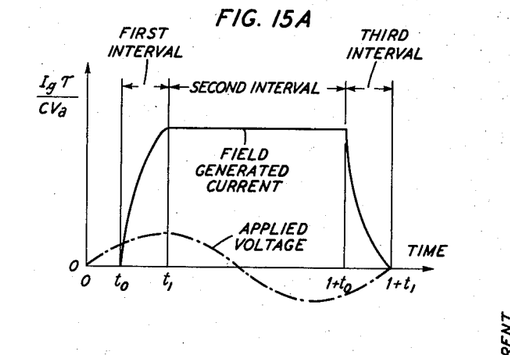
Figs. 15A and 15B are plots of field generated current and applied voltage against time for an entire period of the operating frequency of the negative dynamic resistances of this invention.
Figure 15B:
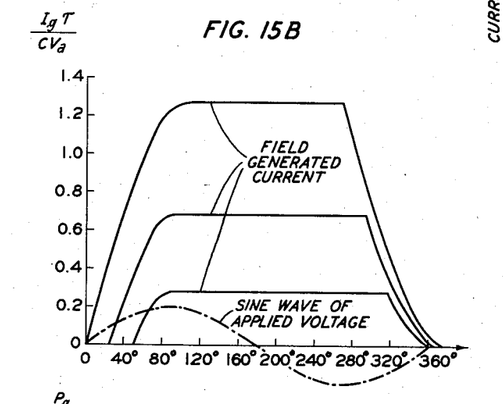

Consider a semiconductive body 10 of some material such as germanium, silicon, or the compounds of metals from groups III and V biased to a condition such that the space charge region extending between the lines 11 and 12 and intermediate normal $p$ and $n$ zones has a maximum field near the left edge of the region as represented by the dotted line 13 in Fig. 1. Conditions can be chosen such that the reverse bias, $p$ zone negative and $n$ zone positive, when coupled with the maximum signal swing produces a large enough field to generate hole-electron pairs at 13. This critical field for current generation has been observed in semiconductors at greater than about $10^5(E_g/0.7)^{3/2}$ volts per centimeter where $E_g$ is the energy gap of the material, about 0.7 electron volt for germanium and 1.1 electron volts for silicon. A generated hole flows immediately into the adjacent $p$ zone. The electron traverses the space charge region to the positively biased normal $n$-type material. Current flows during the entire transit time of the electron and is a function of the charge flowing and its velocity. The field in those portions of the space charge region other than that wherein the hole-electron pair is generated is in the range where charge carrier velocity is independent of field, about 3000 volts per centimeter at room temperature for electrons and somewhat greater for holes. This range of field will be referred to hereafter as the Ryder range; it is discussed in some detail in W. Shockley's paper "Hot Electrons in Germanium and Ohm's Law" appearing in the Bell System Technical Journal, volume XXX, No. 4, pages 990–1034 (1951), see particularly Fig. 2. As a result of this field having a magnitude in the Ryder range the electrons traverse the space charge region with constant velocity and a constant current flows during the transit time. When the depicted device is operated with an intermediate amplitude of signal voltage, the transit time of the electrons created at the peak of the signal is three-quarters of a cycle so that current and voltage vary with time as plotted in Fig. 2, and at large signal amplitudes current and voltage are as shown in Figs. 15A and 15B. Clearly power is being delivered to the alternating-current voltage source since a net amount of work is being done by the flowing current against the alternating-current voltage (no current flows during the first quarter-cycle; equal and opposite amounts of work are done during the second and third quarter-cycles; in the fourth quarter-cycle the current and alternating-current voltage are opposite). Thus the particular hole-electron pair generated at the peak field delivers power. Actually there will be a distribution of pairs generated over the space charge region and during the alternating-current cycle. However, the distribution can have a maximum at the peak field (maximum field in both space and time); so that the integrated effect of all the pairs is to deliver power.

While the detailed description and analysis of negative dynamic resistances diodes will be directed toward devices having a field in the space charge region wherein charge carrier velocity is constant and a space charge region of substantially constant width, it is to be understood that negative resistance can be obtained when the fields are such that charge carrier velocity and width of the space charge region varies, for example as occurs with a device having a single $n$ and $p$ zone operated in the manner disclosed, provided the integrated product of signal voltage and signal current is negative.

Figure 3A:
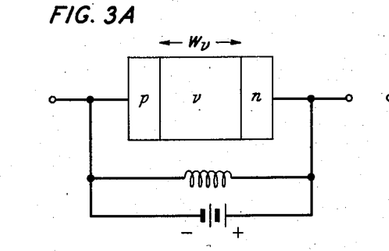
Figs. 3A, 4A, 5A and 6A and 3B, 4B, 5B, and 6B show respectively in diagrammatic form semiconductive negative dynamic resistances of the type contemplated by this invention and plots of the field distribution therein along their lengths.

Several semiconductive body configurations are available wherein carriers will be generated by the peak field only in a small fraction of the width of space charge region, and the velocity of the carriers does not drop appreciably as they traverse the space charge region. Fig. 3A shows one such form of structure. There are three zones of different conductivity; on the left, a highly doped $p$ zone, in the center, a weakly doped $n$ zone, called a $\nu$ zone, and on the right, a highly doped $n$ zone. As is conventional in the art, $p$-type material is that which contains a predominance of acceptor centers, negative ionized centers each giving rise to an electron deficit or hole in the crystal structure of the semiconductor, over donor centers, positive ionized centers each giving rise to an electron, and normal conduction therein is by hole flow. Conversely, $n$-type material contains a predominance of donor centers over acceptor centers and normal conduction therein is by electrons. A highly doped material is one containing a large predominance of one type of center which determines or fixes the charge carriers available in the material for conduction under ordinary circumstances. Intrinsic material is that in which the excess of conductivity-type determining centers is very small and generally the charge carriers available for conduction at room temperature, 300° K. are thermally excited rather than due to the presence of conductivity-type centers. Intrinsic material contains of the order of or less than $10^{12}$ conductivity-type determining centers per cubic centimeter. The weakly doped or $\pi$ and $\nu$ type materials also contain only small excesses of conductivity-type determining centers; however, they contain a clear predominance of acceptor or donors, respectively, the centers being present in the range from $10^{12}$ to somewhat greater than $10^{14}$ centers per cubic centimeter. Intrinsic, $i$-type; weakly $n$-type, $\nu$-type; and weakly $p$-type, $\pi$-type, semiconductive materials will be referred to generically as "material of low conductivity" or "material containing at least a near balance of conductivity-type determining centers of opposite types." These centers can be created by the presence in the semiconductor of certain materials termed conductivity determining materials, for example, materials from the fifth group of the periodic table such as phosphorus, arsenic, antimony, and bismuth are typical donors while materials from the third group such as boron, aluminum, gallium, and indium are typical acceptors in the semiconductors germanium and silicon. The semiconductive intermetallic compounds of group III and group V materials are made $n$-type by materials from group VI such as tellurium and selenium, while materials from group II, such as magnesium and zinc, act as acceptors.

The unit as shown in Fig. 3A is biased in reverse. When the reverse bias is increased $V_d$, the direct-current voltage drop across the unit, increases from zero, and a space charge develops at the $p$-$\nu$ junction. The $p$ zone is highly doped so that there is negligible penetration of the space charge into the $p$ zone even at the critical voltage where current is generated by the field. When $V_d$ reaches a critical value $V_p$, the punch through voltage, the space charge extends completely through the $\nu$-layer. The $n$ zone is also sufficiently highly doped that the space charge penetrates into it a distance that is negligible compared to the width of the $\nu$ zone. Thus when $V_d < V_p$, the width W of the space charge region increases as the square root of $V_d$. When $V_d > V_p$, W is constant and equal to the width of $W_\nu$ of the $\nu$-layer.

Figure 3B:
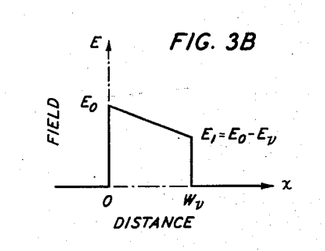

When the unit is operated as a negative resistance, it is so biased that $V_d$ exceeds $V_p$. Fig. 3B illustrates the distribution of field E as a function of distance $x$ where $x=0$ is at the $p$-$\nu$ junction. It is convenient to discuss the device in terms of the field distribution; the slope of the field vs. $x$ curve ($dE/dx$) gives the net charge in the space charge region (from Poisson's equation). The area under the curve from 0 to $x$ gives the potential at $x$.

$E_0$ is the value of E at $x=0$. $E_0$ is the maximum value of E. $E_\nu$ is the drop in field in the $\nu$-layer and is given by the width and resistivity of the $\nu$-layer. If $N_\nu$ is the excess of donors over acceptors in the $\mu$-layer, then, when no current is flowing (or when the number of carriers is small compared to $N_\nu$)

$$E_\nu = \frac{4\pi q}{\eta} N_\nu W_\nu \qquad (1)$$

where q is the electronic charge and $\eta$ the dielectric constant. The capacity of the unit varies inversely as W. Call C the capacity for values of $V_d$ in excess of $V_p$. Then $$C = \frac{\eta}{4\pi W_\nu} \qquad (2)$$

and $$E_\nu = \frac{qN_\nu}{C} \qquad (3)$$

At the punch through voltage, E varies from $E_\nu$ at $x=0$ to zero at $x=W_\nu$. Thus $$V_p = \frac{W_\nu E_\nu}{2} \qquad (4)$$

For any value of $V_d$ in excess of $V_p$, $$V_d = E_0 W_\nu - V_p = W_\nu \left[ E_0 - \frac{1}{2} E_\nu \right] \qquad (5)$$

If $E_g$ is the critical field for current generation, then the critical voltage will be $$V_g = E_g W_\nu - V_p = W_\nu \left[ E_g - \frac{E_\nu}{2} \right] \qquad (6)$$

Figure 4A:
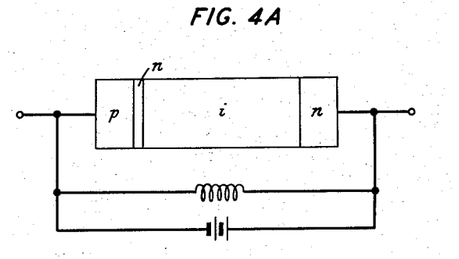
Figure 4B:
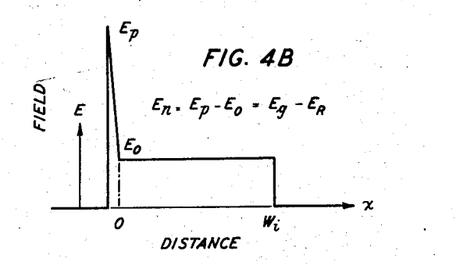
Figure 5A:
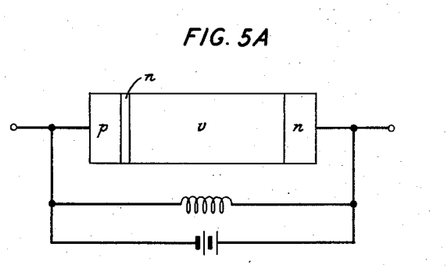
Figure 6A:
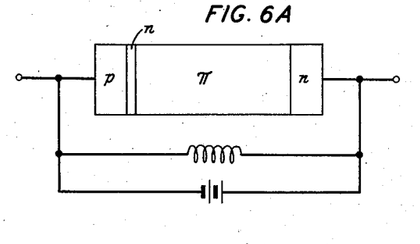

There are several alternative structures of the same general type which operate in the manner of the structure of Fig. 3A to produce a negative dynamic resistance. These structures as depicted in Figs. 4A, 5A, and 6A have localized field generated carrier sources and space charge regions of fixed width. One such is shown in Fig. 4A; it has four zones of different conductivity, p-n-i-n, where i means intrinsic. Fig. 4B shows the field distribution of the p-n-i-n structure under reverse bias. The first n-layer is small in width compared to the width $W_i$ of the intrinsic zone. The total fixed charge in the first n-layer is such that the drop in field $E_n$ is equal to the difference $E_g - E_R$ where $E_R$ is the field in the middle of the Ryder range, where carrier velocity is independent of field. The Ryder range extends about half a decade in the range of about $10^4$ volts per centimeter. The total fixed charge $Q_n$ (per cm.²) in the first n-region is therefore given by $$Q_n = \frac{\eta}{4\pi} E_n = \frac{\eta}{4\pi} (E_g - E_R) \qquad (7)$$

The first n layer is preferably made as narrow as fabrication techniques will permit so that (despite the high field in it) there is negligible voltage drop across it. In Fig. 4B, $x=0$ at the left-hand edge of the $i$ zone and $E_0$ is the value of E at $x=0$. The peak field $E_p$ (at the p-n junction) differs from $E_0$ by the constant $E_n = E_g - E_R$. The direct-current voltage neglecting the voltage drop across the n-layer is $$V_d = E_0 W_i \qquad (8)$$

Ideally, the fixed charge $Q_n$ should be so controlled that $E_n$ differs by its prescribed value (Equation 7) by a small percentage of $E_R$. Since $E_g \approx 2 \times 10^5$ and $E_R$ is about $10^4$, $E_n$, and therefore $Q_n$, must be controlled to within about a percent. Also the balance of acceptors and donors in the i-layer, advantageously realized in material devoid of both, should be such that there will be negligible variation of field through it; one means of accomplishing this is by controlled electron bombardment of a near intrinsic $\nu$-layer.

Figure 5B:
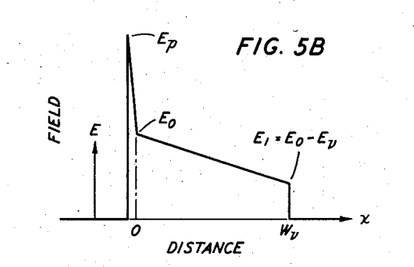
Figure 6B:
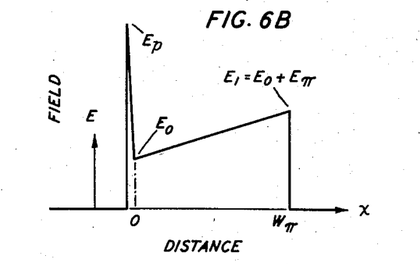

Fig. 5A shows the same structure as Fig. 4A except that the i-layer has been replaced by a $\nu$-layer. The corresponding field distribution is shown in Fig. 5B where $E_p$, $E_n$, and $E_\nu$ have the same meaning as before. Fig. 6A shows a p-n-π-n structure (π denotes weakly doped p-type). In both cases, it is assumed that all but a negligible fraction of the voltage drop occurs in the $\nu$ or π region. In Figs. 5A and 5B, $V_d = E_0 W_\nu - V_p$ where $$V_p = \frac{W_\nu E_\nu}{2}$$

and in Figs. 6A and 6B, $V_d = E_0 W_\pi + V_p$ where $$V_p = \frac{W_\pi E_\pi}{2}$$

It is to be understood that the structures disclosed in Figs. 3A, 4A, 5A, and 6A are relatively small and, therefore, have been exaggerated in some of their proportions for purposes of illustration. Since these devices are operated at high currents it is desirable to employ current paths of large cross section. In practice wafer shaped devices having the interfaces bounding the several zones parallel to the major faces of the wafer and current paths normal to those faces constitute one advantageous device form. A further advantage resides in mounting the semiconductive wafers on bodies having a large thermal capacity, high thermal conductivity, and cooling means, for example a massive metallic block which is cooled by contact with some fluid.

The structures depicted in Figs. 3A, 4A, 5A, and 6A can be produced from single crystal germanium bodies of intrinsic, π or $\nu$ material, for example by the zone melting techniques disclosed in W. G. Pfann's patent application Serial No. 256,791 which was filed November 16, 1951, and is entitled "Process for Controlling Solute Segregation by Zone-Melting." Germanium prepared in the suggested manner can be processed to the desired body forms by introducing materials which produce acceptor or donor centers by heat treating, diffusing, or alloying techniques or a combination of these techinques. For example, a body of intrinsic germanium can be provided with n-type end sections to a predetermined depth by alloying a metal such as gold, platinum, or lead which may contain donor impurities therewith in the manner suggested by W. G. Pfann in his applications Serial Nos. 184,869 and 184,870, filed September 14, 1950. As set forth in the second of these applications a double inversion of conductivity type as is employed in the structures of Figs. 4A, 5A, and 6A obtained by employing an alloying material which contains both acceptors and donors chosen so that one penetrates the semiconductor further than the other. Thus, in the present structures a metallic composition of an inert metal such as platinum, contianing a relatively large proportion of a donor such as phosphorus and a small proportion of an acceptor such as aluminum, can be alloyed with and diffused into the intrinsic germanium to produce a p-n-i structure. Other techniques of converting zones of a semiconductive body by diffusing acceptors or donors into the body at elevated temperatures in the manner disclosed in patent application Serial No. 136,038, filed December 30, 1949, now Patent 2,701,326, issued February 1, 1955, by W. G. Pfann and H. C. Theuerer and W. Shockley's Patent 2,569,347 which issued September 25, 1951. A layer of phosphorus or phosphorous bearing material can be mounted against the surface of an intrinsic germanium and the material thereunder made n-type to a depth which is dependent upon the quantity of phosphorus and the temperature and length of the diffusion process. Subsequently, an acceptor such as boron, gallium, or indium can be diffused into the n zone short of its limits to produce a surface of p-type material thereon and a p-n-i structure.

In explaining and evaluating the performance of the designs discussed above and particularly the generation and flow of carriers in the high fields in the respective space charge regions the fololwing two assumptions will be made:

(1) The rate $g$ of generation of hole-electron pairs at any point in the space charge region depends only on the value of E at that point. It will be noted that no assumptions are made about the basic physical nature of field genertaion. It is experimentally established that at sufficiently high fields (of the order of $10^5$ volts/cm.), hole-electron pairs are generated by the field alone. This is conventionally called Zener current; however, since it may be secondary emission or some other effect, it will be referred to as field generated current. If what is called Zener current is, in fact, secondary emission or some other effect, then the rate of generation of hole-electron pairs may depend not only on E but on the average value of E over some critical distance or time. However, if the critical distance is small compared with the dimensions of the space charge region, or the time small compared to the alternating-current period, then it will be a valid approximation to regard rate of generation as a function of E.

(2) Carriers flow through the space charge region with constant velocity. Electrons are the carriers of interest in the disclosed embodiments of negative dynamic resistances and it will be assumed that they traverse the space charge region with constant velocity $v$. This assumption limits (a) the direct-current variation in field and (b) the amplitude of time variation of field during an alternating-current cycle. The limitation, however, is not severe from a practical viewpoint since, at the high fields involved, the velocity is relatively insensitive to electric field. (See, "Hot Electrons in Germanium and Ohm's Law" by W. Shockley, Bell System Technical Journal, October 1951, pages 990–1034.) In the Ryder range of fields velocity is independent of field over about half a decade or more in field.

Consider the current that flows as $V_d$ is raised and approaches the voltage $V_g$. This explanation shall apply to devices having what are called hard junctions. In such a junction, the generation of hole-electron pairs is negligible when the maximum E is below $E_g$; above $E_g$, current increases abruptly with field. When $V_d < V_g$, E is everywhere less than $E_g$ and negligible current is generated. When $V_d = V_g$, then the peak field (at $x=0$) equals $E_g$ and appreciable current is generated in a small region near $x=0$. The ideal structure and operating conditions to be considered are those where E equals or exceeds $E_g$ only in a zone whose width is small compared to $Wv$. As described above this zone is established in the form of a thin layer having a high concentration of fixed charge. It is then a good approximation to regard the current as being generated at the plane $x=0$, and to assume that no hole-electron pairs are generated elsewhere in the space charge region.

Call $g=g(t)$ the rate of generation of hole-electron pairs at $x=0$. $g$ is a function of the field $E_0$ at $x=0$. In hard junctions, a good approximation is $$g=\left(\frac{E_o}{E_g}\right)^m \qquad (9)$$

where $m$ is of the order of 100. Under direct-current conditions, $g$ is equal to the measured current $I_d$ that flows in the external circuit. Using $g=I_d$ and Equations 5 and 6, we can write Equation 9 as $$\frac{d\ln I_d}{d\ln V_d}=\frac{mV_d}{V_d+V_p} \qquad (10)$$

for the $p$-$\nu$ junction in Fig. 3A. In the range of interest $V_d$ differs by only a small percentage from $V_g$; therefore the right-hand side of Equation 10 is approximately constant and the $\ln I_g$ vs. $\ln V_d$ curve is approximately a stright line of slope $m'$ where $$m'=\frac{mV_g}{V_g+V_p}$$

Measured values of $m'$ vary from 25–1500 for different hard junctions in silicon and germanium.

A quantity that will be important later in the discussion is the direct-current incremental resistance $$R=\frac{dV_d}{dI_d}=\frac{V_d}{m'I_d}$$

Since $V_d$ in the range of interest differs only slightly from $V_g$, R varies approximately inversely with $I_g$ and $$R=\frac{V_g}{m'I_d} \qquad (11)$$

The holes generated at $x=0$ flow immediately into the adjacent $p$-region on the left. The electrons flow to the right and move through the space charge region with velocity $v$, which is assumed to be constant. An important parameter is the transit time $\tau$ of an electron through the space charge region. (The following discussion will deal with the $p$-$\nu$-$n$ unit shown in Fig. 3A. Corresponding equations are readily written for the alternative structures.) The transit time of an electron through the $\nu$-layer is $$\tau=\frac{W_\nu}{v} \qquad (12)$$

Now consider the current I that flows in the space charge region. Suppose the applied voltage $V=V(t)$ is varying arbitrarily with time $t$. A current of electrons $g(t)$ is flowing out of the plane $x=0$ and into the space charge region. All currents are conductive currents, equal to the charge density times velocity. All the electrons that flow out of $x=0$ move to the right with velocity $v$; therefore $I=I(x,t)$ is given by $$I(x,t)=g(t-x/v) \qquad (13)$$

Next consider the current $I_e$ that flows in the external circuit. $I_e$ has two parts $$I_e=I_g+I_c \qquad (14)$$

where $I_c$ is the current that would flow if there were no carriers in the space charge region. $I_c$ is simply a capacitative current and is given by $$I_c=C\frac{dV}{dt} \qquad (15)$$

In other words, $I_c$ charges and discharges the unit regarded as a condenser; $I_c=0$ under direct-current conditions. $I_g$ is the current that would flow in the external circuit if V were kept constant while the carriers move through the space charge region. $I_g$ would be zero if there were no moving carriers in the space charge region. $I_g$ is equal to the average current in the space charge region.

Let the space charge region extend from $x=o$ to $x=w$. At $x=o$ and $x=w$, the field $E=0$. In the discussion above $x=o$ has been taken at the edge of the $\nu$-region which is only a negligible distance from the edge of the space charge region; however, in that negligible distance the field rises from zero to $E_0$ because of the very high fixed charge density. The following argument is general in that it applies to any field distribution. The current I at $x=o$ and $x=w$ is equal to the current $I_e$ in the external circuit. We shall deal with the general case where there are both holes and electrons and where hole-electron pairs are generated anywhere in the space charge region.

It will be convenient to eliminate the direct-current field distribution by differentiating Poisson's equation with respect to $t$;

$$\frac{\delta^2 E}{\delta x \delta t}=\frac{4\pi q}{\eta}\frac{\delta}{\delta t}(n-p) \qquad (A1)$$

wherein $n$ and $p$ are the electron hole densities respectively.

To express $n-p$ in terms of current employ the continuity equations:

$$\frac{\delta n}{\delta t}=-\frac{1}{q}\frac{\delta I_n}{\delta x}+g \qquad (A2)$$

$$\frac{\delta p}{\delta t}=\frac{1}{q}\frac{\delta I_p}{\delta x}+g \qquad (A3)$$

where $g$ is the rate of generation of hole-electron pairs (by thermal energy, light, field emission, secondary generation or any other cause) and $I_n$ and $I_p$ are the electron and hole currents: $I=I_n+I_p$. Subtracting (A3) from (A2) gives $$\frac{\delta}{\delta t}(n-p)=-\frac{1}{q}\frac{\delta I}{\delta x} \qquad (A4)$$

Substituting (A4) and (A1) and integrating (remembering that $E=0$ and $I=I_e$ at $x=0$), we have $$\frac{\delta E}{\delta t} = \frac{4\pi}{\eta}(I_e - I) \tag{A5}$$

By definition $$I_c = C\frac{dV}{dt} = \frac{\eta}{4\pi W}\int_0^W \frac{\delta E}{\delta t}dx \tag{A6}$$

From (A5) and (A6)

$$I_c = I_e - \frac{1}{W}\int_0^W I(x,t)dx \tag{A8}$$

By definition $I_e = I_c + I_g$; thus (A8) gives $$I_g(t) = \frac{1}{W}\int_0^W I(x,t)dx \tag{A9}$$

Thus for the structure of Fig. 3A the average current in the space charge region is:

$$I_g(t) = \frac{1}{W_\nu}\int_0^{W_\nu} I(x,t)dx$$

$$= \frac{1}{W_\nu}\int_0^{W_\nu} g(t-x/v)dx$$

$$= \frac{1}{\tau}\int_{t-\tau}^t g(t')dt' \tag{16}$$

Thus at frequencies that are small compared to $1/\tau$, $I_g(t) = g(t)$.

Next we find the relation between the applied voltage $V(t)$ and $g(t)$.

$$V(t) = \int_0^{W_\nu} E(x,t)dx \tag{17}$$

$E = E(x,t)$ is given by Poisson's equation, which is $$\frac{\delta E}{\delta x} = \frac{4\pi}{\eta}\left(\frac{I}{v} - N_\nu q\right) \tag{18}$$

Where $N_\nu$ is given by Equation 3. Integrating Equation 18

$$E(x,t) = E_0(t) - \left(\frac{E_\nu}{W_\nu}\right)x + \frac{4\pi}{\eta}\int_0^{\frac{x}{v}} g(t-t')dt' \tag{19}$$

Equation 9 gives $E_0 t$ in terms of $g(t)$. Integrating Equation 19 and using Equation 4 and Equation 6 gives $V(t)$ in terms of the function $g(t)$.

$$V(t) = (V_g + V_p)g^{\frac{1}{m}}(t) - V_p + \frac{4\pi}{\eta}\int_0^{W_\nu}dx\int_0^{\frac{x}{v}} g(t-t')dt' \tag{20}$$

The following discussion applies to several special cases where the equations assume a simple form and are easily solved. The difficulty of solution depends on the amplitude of the time variation of the quantities. For very small variations, the change in $g$ is directly proportional to the change in $E_0$; the problem is then linear and is solved by standard linear direct-current procedures. An even simpler case is that of variations of intermediate alternating-current amplitude.

The operation of the device as a high frequency "negative resistance" for a range of alternating-current voltage of intermediate amplitudes will be considered. The analysis applies to any structure where carriers are generated in one lump at the peak of the alternating-current cycle and at one edge of a space charge region (of constant width) and traverse the region with a constant velocity.

The device is biased just below $V_g$. An alternating-current signal is superposed on the direct-current bias. The angular frequency $\omega$ of the applied alternating-current signal chosen for optimum negative dynamic resistance is $$\omega = \frac{3\pi}{2\tau} \tag{23}$$

The amplitude $V_a$ of the alternating-current signal is such that the total applied voltage $$V(t) = V_d + V_a \sin \omega t \tag{24}$$

exceeds $V_g$ for a short (compared with $\tau$) time at the peak of the alternating-current cycle. Thus, a negligible quantity of charge carriers is generated during most of the cycle. However, for a short time at the peak of the alternating-current cycle, $E_0$ equals or slightly exceeds $E_g$ and a short pulse of charge is generated at $x=0$. If the time during which the pulse is being generated is small compared to $\tau$, then in the calculations we can regard the generated electrons as an instantaneous pulse of charge that appears at $x=0$ at the time $\omega t = \pi/2$ and thereafter moves with uniform velocity $v$ to the right.

Figure 7A:
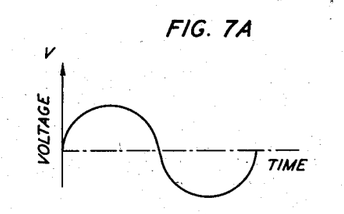
Figs. 7A, 7B, and 7C show the time variation of voltage, rate of charge carrier generation and current flow in the external circuit of a negative dynamic resistance of the type contemplated in this invention.
Figure 7B:
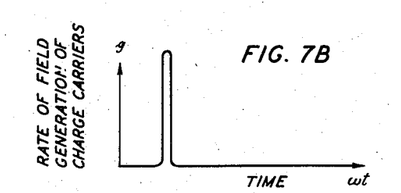
Figure 7C:
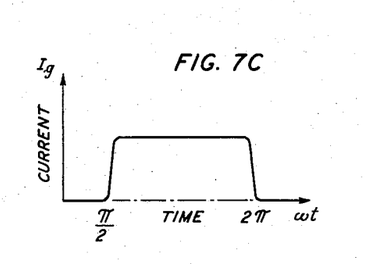

Fig. 7A shows the time variation of $V(t)$. $E_0(t)$ varies in phase with $V(t)$. $g(t)$ is zero except at the peak of the cycle where it rises abruptly to a sharp peak and immediately falls back to zero as shown in Fig. 7B. The current $I_g$ flowing in the external circuit is shown in Fig. 7C. As discussed in the preceding section, $I_g$ is the average current in the space charge region. For $0 < \omega t < \pi/2$, no current flows in the external circuit. At $\omega t = \pi/2$ a pulse of electrons is generated. Let $Q_g$ be the charge of the pulse. $Q_g$ is the area under the $g(t)$ curve in Fig. 7B. $Q_g$ traverses the space charge region in time $\tau$, starting at $x=0$ at time $\omega t = \pi/2$ and reaching the end ($x=W$) of the space charge region at $\omega t = 2\pi$. During this time a charge $Q_g$ is moving with velocity $v$ through the space charge region; thus the average current in the space charge region is $Q_g v/W_\nu = Q_g/\tau$. Therefore $$I_g(t) = 0 \text{ for } 0 < \omega t < \frac{\pi}{2}$$

$$I_g(t) = \frac{Q_g}{\tau} \text{ for } \frac{\pi}{2} < \omega t < 2\pi \tag{25}$$

$I_g(t)$ is also shown in the figure. The area under the $I_g(t)$ curve of Fig. 7C is equal to the total charge that flows, which is $Q_g$.

Comparing the $I_g(t)$ curve of Fig. 7C and $V(t)$ curve of Fig. 7A shows why power is delivered to the alternating-current field. The total current in the external circuit is $I_g + I_c$ where $I_c$ is a capacitative current that gives no real power. Thus the work done by the applied alternating-current voltage per cycle is the product of $I_g$ and the alternating-current voltage integrated over a complete cycle. No work is done in the first quarter of a cycle. Equal and opposite amounts of work are done during the second and third quarters. In the final quarter work is done by the current against the alternating-current voltage. Thus power is being delivered from the direct-current bias to the alternating-current signal. Power will be delivered to the signal in this device provided that current $I_g$ flows over an interval which provides a negative integrated product of $I_g$ and the alternating-current voltage. This requires current flow for a period greater than that of an odd number of half of cycles and less than the next full cycle where charge is generated only at the instant the signal is at its maximum bias aiding level or:

$$\frac{n\pi}{\omega} < \tau > \frac{(n+1)\pi}{\omega}$$

where $n$ is an odd integer. The energy delivered per cycle (work done in last quarter cycle) for $n=1$ is $$\frac{2V_a}{3\pi}Q_g$$

This work divided by the period $2\pi/\omega$ gives the average power delivered $P_g$.

$$P_g = \frac{V_a Q_g}{2\pi \tau} \tag{26}$$

Figure 20:
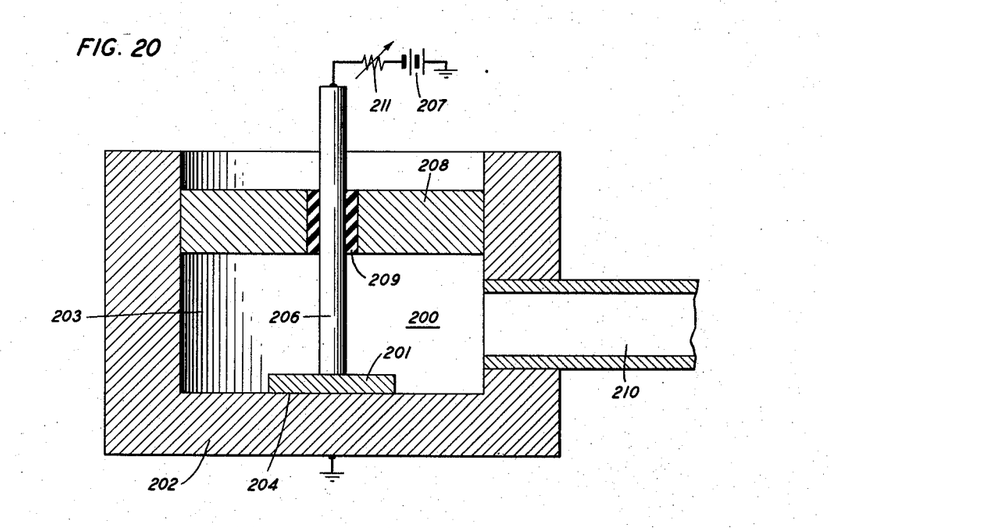
Fig. 20 is a sectioned elevation of a negative resistance oscillator in accordance with this invention wherein a negative resistance element such as those shown in Figs. 3A, 4A, 5A, and 6A is mounted in a tuned cavity and suitably coupled to an output circuit.

The fact that $P_g$ is positive shows that the unit will oscillate when connected into a tuned circuit. At the frequencies involved a microwave cavity which looks to the unit like an inductance with $LC=\omega^2$ can be employed as shown in Fig. 20. $P_g$ would then be the rate of increase of the energy of oscillation. As the oscillation builds up, the peak $V(t)$ exceeds $V_g$ by a greater amount every cycle. Thus $Q_g$—and therefore $P_g$—increases and the oscillation builds up more rapidly. Finally $V(t)$ exceeds $V_g$ over an interval of time which is no longer small compared to $\tau$ and the above analysis no longer applies and a larger signal analysis must be employed. However, in the intermediate range of amplitudes, the device will operate as an oscillator and the power delivered will increase with amplitude.

An oscillator employing a negative dynamic resistance unit as described above is shown in Fig. 20. It comprises a basic diode unit 200, such as those shown in Figs. 3A, 4A, 5A, or 6A, mounted with a major face of the semiconductive body 201 contacting wall 202 of tunable cavity 203 and making a low resistance ohmic contact 204 of high heat conductivity therewith. The cavity may be grounded. The second electrical connection is made to the semiconductor body on the major surface opposite the contact 204 by lead 206 which is connected to a suitable source of potential 207 arranged to bias an n-p junction intermediate the lead 206 and connection 204 in the reverse direction of conduction. A bias adjusting means such as a variable series resistance 211 is provided in the circuit to lead 206. Lead 206 is so arranged that the cavity is symmetrically disposed around it except for the output therefrom. The cavity is provided with tuning means in the form of a plunger 208 electrically connected to the walls and arranged for movement along the axis of the cavity. An insulating bushing 209 is fitted into the plunger and journalled on lead to isolate the lead from the cavity electrically and to permit axial movement of the plunger along the lead. The height of the plunger is adjusted so that cavity 203 functions as an inductance tuned with the capacitance of the diode. The output of the tuned combination constituting the oscillator is fed from the cavity 203 through a guiding means 210 of suitable dimensions for the transmission of electromagnetic waves of the frequencies generated by the oscillator.

Starting with an amplitude of zero, oscillations will build up in a negative dynamic resistance of the type under discussion. This is readily appreciated from an analysis of the performance of the device for the case where the alternating-current signal is small enough that the variation in $g$ is directly proportional to the alternating-current variation of the field $E_0$ at $x=0$. We continue to deal with the case where appreciable current is generated only in a portion near $x=0$ which is small in width compared to the width $W(=W_v, W_m \text{ or } W_i)$ of the space charge region. Thus the alternating-current variation in $g(t)$ is directly proportional to the alternating-current variation in peak field $E_0(t)=(0,t)$.

Again let the applied voltage vary sinusoidally with time with angular frequency $\omega=3\pi/2\tau$. It will be convenient in this analysis to use complex quantities and consider only the alternating-current part of the solution. All of the quantities will vary in proportion to $e^{i\omega t}$. Let $\bar{I}(x)e^{i\omega t}$ and $\bar{E}(x)e^{i\omega t}$ be the alternating-current and field respectively. Let the alternating-current rate of generation of hole-electron pairs at $x=0$ be $\bar{g}e^{i\omega t}$. Take the zero of time so that $\bar{g}$ is real. The applied alternating-current voltage is then $\bar{V}e^{i\omega t}$ where, in general $\bar{V}$ is a complex constant. In the same way the complex constants $\bar{I}_g$, $\bar{I}_c$, $\bar{I}_e$, and $\bar{E}_0$ define the alternating-current variation of $I_g(t)$, $I_c(t)$, $I_e(t)$, and $E_0(t)$.

It will simplify the equations to choose the units of time, distance, and current so that $$v=\tau=W=\frac{4\pi}{\eta}=C=1$$

$$\omega=\frac{3\pi}{2} \quad (27)$$

Then, if voltages are expressed in volts, the unit field in volts per centimeter is $1/W$ where W is in centimeters. The unit of current in amperes per cm.² is equal to C (in farads per cm.²)/$\tau$ (in seconds).

Since the alternating-current variations in $E_0(t)$ and $g(t)$ are directly proportional to one another $$\bar{E}_0=\frac{r}{\omega}\bar{g} \quad (28)$$

where $r$ is a real dimensionless parameter. In terms of measurable quantities and laboratory units $$r=\frac{2}{3\pi}\frac{C \text{ (in farads) } R \text{ (in ohms)}}{\tau \text{ (in seconds)}} \quad (29)$$

where C and R are the direct-current capacity and incremental resistance measured at the direct-current bias—see Equations 2 and 11.

From Equation 13

$$\bar{I}(x)=\bar{g}e^{-i\omega x} \quad (30)$$

From Equation 6

$$\bar{I}_g=\int_0^1 \bar{g}e^{-i\omega x}dx$$

$$=\frac{\bar{g}}{i\omega}(1-e^{-i\omega})$$

Since $\omega=3\pi/2$, $e^{-i\omega}=i$. Hence $$\bar{I}_g=\frac{\bar{g}}{\omega}(1+i) \quad (31)$$

From Equation 10

$$\frac{d\bar{E}}{dx}(x)=\bar{I}(x) \quad (32)$$

Substituting Equation 30 in Equation 32 and integrating $$\bar{E}(x)=\bar{E}_0+\bar{g}\frac{(1-e^{i\omega x})}{i\omega}$$

where Equation 28 gives $\bar{E}_0$ in terms of $\bar{g}$. Thus $$\bar{E}(x)=\frac{\bar{g}}{\omega}\left[r+\frac{1-e^{i\omega x}}{i}\right] \quad (33)$$

From which $$\bar{V}=\int_0^1 \bar{E}(x)dx$$

$$=\frac{\bar{g}}{\omega}\left[\left(r+\frac{1}{\omega}\right)-i\left(1+\frac{1}{\omega}\right)\right]$$

$$=\bar{V}_1+\bar{V}_2 \quad (34)$$

where $$\bar{V}_1=\frac{\bar{g}}{\omega}(r-1)$$

$$\bar{V}_2=\frac{\bar{g}}{\omega}\left(1+\frac{1}{\omega}\right)(1-i)$$

$$=\frac{\bar{g}}{\omega}(1.212)(1-i) \quad (35)$$

Figure 8:
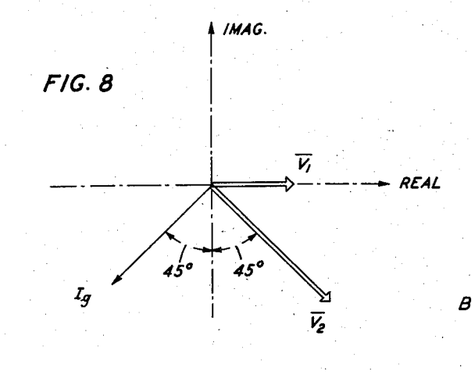
Fig. 8 is a vector diagram showing the components of the complex signal voltage and the current in the space charge region as applicable in the small signal analysis of the devices of this invention.

Fig. 8 shows $\bar{V}_1$, $\bar{V}_2$, and $\bar{I}_g$ plotted as vectors in the complex plane with $$\frac{\bar{g}}{\omega}=1$$

The figure is useful for finding alternating-current power. The real alternating-current power $P_g$ is one-half the dot product of $\bar{V}$ and $\bar{I}_g$ regarded as vectors. Since $\bar{V}_2$ is 90 degrees out of phase with $\bar{I}_g$, it contributes nothing to the product $\bar{V}\bar{I}_g$. When $r=1$, $\bar{V}_1=0$ and there is no real alternating-current power $(P_g=0)$. When $r<1$, then $\bar{V}$ and $\bar{I}_g$ are less than 90 degrees out of phase and work is done by the alternating-current voltage. When $r>1$, $\bar{I}_g$ and $\bar{V}$ are more than 90 degrees out of phase and power is delivered to the alternating-current voltage. For any value of $r$, $P_g$ is given by $$P_g = \frac{\bar{g}^2}{\omega^2}(r-1) \qquad (36)$$

The magnitude $V_a$ of the complex quantity $\bar{V}$ is found from Equation 34

$$V_a^2 = \frac{\bar{g}^2}{\omega^2}\left[\left(r+\frac{1}{\omega}\right)^2 + \left(1+\frac{1}{\omega}\right)^2\right] \qquad (37)$$

Equations 36 and 37 show that $P_g$ equals $V_a^2$ times a function of $r$, where the function of $r$ has a maximum for some value of $r$ greater than 1 (for $r \gg 1$, $P_g = V_a^2/r$; thus $P_g$ increases with $r$ for $r$ near unity and decreases with $r$ for large $r$). It will be more practical, however, to find the $r$ which maximizes the ratio of $P_g$ to the imaginary (90 degrees out of phase) power $P_i$. The ratio $P_i/P_g$ is the negative Q of the device, which should be as small as possible. The device will operate as an oscillator in a tuned circuit if the Q of the circuit is greater than $P_i/P_g$.

Figure 9:
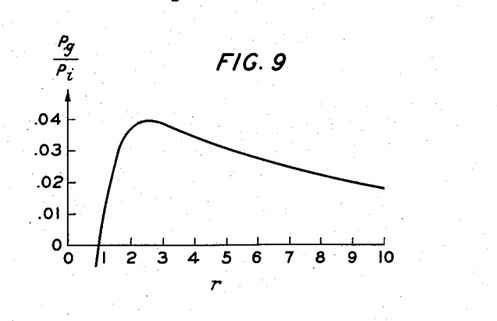
Fig. 9 is a plot of the ratio of the average power delivered, $P_g$, to the imaginary power, $P_i$, as a function of $r$, a real dimensionless parameter defined in Equation 28 for a negative dynamic resistance constructed in accordance with this invention.

The contribution of $\bar{I}_g$ to $P_i$ is found by rotating the vector $\bar{I}_g$ through 90 degrees clockwise and taking the dot product with $\bar{V}$. The capacitative current $$\bar{I}_c = i\omega \bar{V}$$

contributes a term $\frac{1}{2}\omega V_a^2$ to $P_i$. Using the numerical value of $\omega = 3\pi/2$ and adding the contributions of both $\bar{I}_g$ and $\bar{I}_c$ to $P_i$ we find $$\frac{P_g}{P_i} = \frac{r-1}{4.7r^2 + r + 5.8} \qquad (38)$$

which is plotted in Fig. 9. The maximum occurs for $r=2.5$ and is equal to $\frac{1}{25}$. Thus the device will oscillate and the amplitude of the oscillations will build up provided the Q of the external circuit is greater than 25. This is quite a reasonable requirement, especially for a microwave cavity.

A range of alternating-current amplitudes and bias conditions will now be analyzed where the voltage reaches the critical voltage $V_g$ at a time $t_0$ which is before the peak of the cycle ($\omega t_0 < \pi/2$). Hole-electron pairs are then generated at $x=0$; generation begins at $t=t_0$ and continues until a time $t=t_1$ when the maximum field again falls below $E_g$ and the rate of generation becomes negligible. This analysis is more general and deals with larger amplitudes than the analysis of intermediate amplitudes of alternating-current voltage discussed above, because the time interval, $t_1 - t_0$ (during which current is being generated) is not required to be small compared with the transit time $\tau$. The assumption is adhered to that negligible current is generated outside of a region (near $x=0$) which is small compared to $W_v$; this condition is automatically satisfied in the structures shown in Figs. 4A, 5A, and 6A. We shall, in the course of the analysis, derive the range of amplitudes where, for the structure in Fig. 3A, current is generated during a time that is not negligible compared to $\tau$ but in a space that is negligible compared with $W_v$.

It will be shown that $P_g/P_i$ is a function only of the time $t_0$ when the peak field first exceeds $E_g$. $P_g/P_i$ is independent of the alternating-current voltage amplitude $V_a$ (both $P_g$ and $P_i$ are proportional to $V_a^2$). However, for a given $t_0$, there is a critical $V_a$ above which the analysis would not be valid for the $p$-$v$-$n$ structure (Fig. 3A) because current would be generated outside of a small region near $x=0$. When current is generated throughout all—or even much— of the $v$-layer, it seems unlikely, from physical reasoning, that the maximum power could be gained.

Assume that the electrons traverse the space charge region with constant velocity. This assumption is exact if the field is in the Ryder range (of constant velocity) throughout the space charge region during the entire alternating-current cycle. Since the Ryder range extends over about half a decade, the alternating-current voltage amplitude can be a relatively large fraction of the direct-current bias without violating the assumption of constant velocity. In the $p$-$v$-$n$ structure, however, the peak field $E_g$ is a factor of about 10 above the constant velocity range—above which the velocity is not known as a function of field. Calculations (Hot Electrons and Ohm's Law—W. Shockley) indicate that velocity increases with field above the constant velocity range but the rate of increase is small compared to the low field mobility. Thus, for the $p$-$v$-$n$ structure, the assumption of constant velocity is good provided $E\nu$ and the alternating-current amplitude are not too great. For the $p$-$n$-$i$-$n$, $p$-$n$-$v$-$n$ and $p$-$n$-$\pi$-$n$ structures—with a sharp narrow peak in field at $x=0$ and relatively constant field in the rest of the space charge region—the assumption of constant velocity will be exact for all practical purposes.

Figure 10:
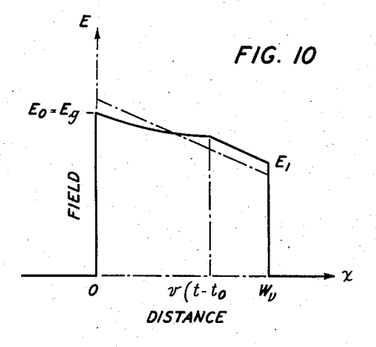
Fig. 10 is a plot of field vs. lentgh along the space charge region for devices of the type shown in Figs. 3A, 4A, 5A, and 6A illustrating the space charge limitation on field.

This discussion will deal with large enough amplitudes and hard enough junctions that it is a good approximation to take $g=0$ for $E_0 < E_g$ and $dg/dE = \infty$ for $E_0 = E_g$. In other words, the ratio of minimum $g$ to maximum $g$ (in a cycle) is negligible compared with unity, and the peak value of $E_0$ in a cycle differs from $E_g$ by a negligible percentage. We will thus be dealing with a case of space charge limited current; that is, the current generated will always be such that its space charge keeps $E_0 = E(0,t)$ from rising above $E_g$. This point is illustrated for the $p$-$v$-$n$ structure in Fig. 10. The dashed curve shows the field distribution that would exist for a given $V > V_g$, if there was no current flowing in the $v$-layer. The solid curve shows the actual field. Since V is given, the area under both curves is the same. The charge of the electrons to some extent neutralizes the fixed positive charge in the $v$-layer. If current started to flow at $t=t_0$, then the charge distribution is modified by the mobile charges in the region from $x=0$ to $x=v(t-t_0)$. Thus, because of the current, the field at $x=0$ (for a given voltage) can be kept at $E_g$.

As before let the applied voltage be $$V(t) = V_d + V_a \sin \omega t \qquad (39)$$

The time $t_0$ when current begins to be generated is given by $V(t) = V_g$; thus $$\frac{V_g - V_d}{V_a} = \sin \omega t_0 \qquad (40)$$

determines $t_0$.

The analysis of all the structures shown in Figs. 3A, 4A, 5A, and 6A is the same except for the direct-current field distribution. In this analysis let primes denote the values of field in excess of the direct-current distribution; so the analysis will apply to any one of the structures— that is, to any structure where carriers are generated at the edge of the space charge region and traverse the space charge region with constant velocity. As before, take the transit time as $\frac{3}{4}$ of a cycle, again let the width W of the space charge region be unit length and take the units of time and current so that $v = \tau = 4\pi/\eta = C = 1$; then $\omega = 3\pi/2$.

Again the relation $I(x,t) = I(t-x) = g(t-x)$ is basic in the analysis. Since $v=1$, $I(x,t)$ is the charge density of the carriers at $x,t$. The current $I_g(t)$ is $$I_g(t) = \int_0^1 I(x,t) dx \qquad (41)$$

Thus $I_g$ is equal to the total charge of the electrons in the space charge region. The rate of change of $I_g$ is equal to the difference between the rate of generation $g(t)$ and the rate at which charge is flowing out at $x=1$, which is $g(t-1) = I(1,t)$. Differentiating Equation 41 gives the same result:

$$\frac{dI_g}{dx} = g(t) - I(1,t) \qquad (42)$$

Now consider how the charge of the carriers modifies the field distribution. Poisson's equation is $$\frac{\delta E'}{\delta x}(x,t) = I(x,t) \qquad (43)$$

Setting $E_1'(t) = E'(1,t)$ and $E_0'(t) = E'(0,t)$, the total drop in field $E_1' - E_0'$ is equal to the total charge of the carriers in the space charge region; so $$E_1'(t) - E_0'(t) = I_g(t) \qquad (44)$$

Equation 44 can also be obtained directly from Equation 43 and Equation 42.

The voltage $V(t)$ is given by $$V(t) = \int_0^1 E(x,t)\, dx \qquad (45)$$

It is easily verified from the preceding equations that $$\frac{dV}{dt}(t) = I(1,t) + \frac{dE_1}{dt}(t) - I_g(t) \qquad (46)$$

We now obtain $I_g$ in terms of $V(t)$. The relation will be different in three different intervals of time during which current is flowing. The three intervals are as follows: (1) The first interval begins at $t=t_0$ and lasts while free electrons are being generated at $x=0$ and moving into the space charge region; the charge on these electrons keeps the peak field from rising above the critical value. In other words, in this interval $E_0'(t) = E_g'$ (by definition, $E_g'$ is the difference between the direct-current peak field and the critical field $E_g$). At a time $t_1 > t_0, E_0'$ drops below $E_g'$ and no more carriers are generated. Thus $g(t) = 0$ except during the interval from $t_0$ to $t_1$. Since $I_g$ equals the total charge of the carriers, it starts from zero at $t=t_0$ and rises to a maximum at $t=t_1$. In fact $t_1$ is found from $dI_g/dt = 0$.

Consider only the case where $t_1 - t_0 < 1$; that is where current has stopped being generated (at $x=0$) before the first electrons to be generated (those generated at $t=t_0$) have completely traversed the space charge region. Thus during the first interval $(t_0 < t < t_1)$, $I(1,t) = 0$; so Equation 46 becomes $$\frac{dV}{dt} = \frac{dE_1}{dt} - I_g \qquad (47)$$

Since $E_0(t) = E_g = $ constant, Equation 44 gives $$\frac{dE_1'}{dt} = \frac{dI_g}{dt} \qquad (48)$$

Figure 11:
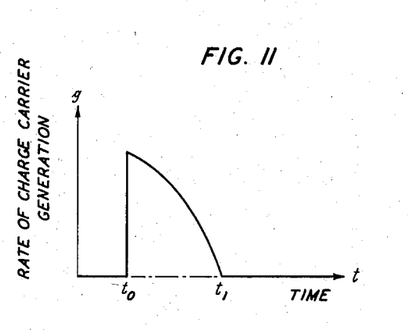
Fig. 11 is a plot of rate of carrier generation vs. time while free carriers are being generated and are moving into the space charge region.
Figure 12:
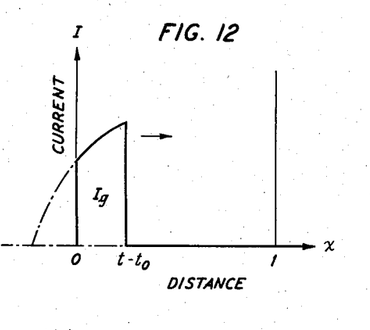
Fig. 12 is a plot of current against position along the path of flow in the device as it operates as a negative dynamic resistance.
Figure 13A:
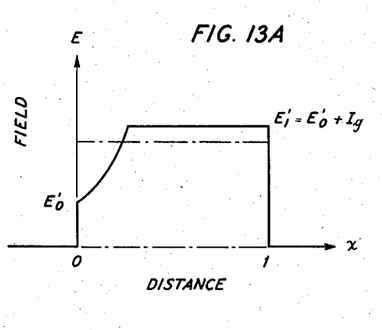
Figs. 13A and 13B are curves showing the relationship of field to distance along the path of moving charge and the modification of field by current.
Figure 13B:
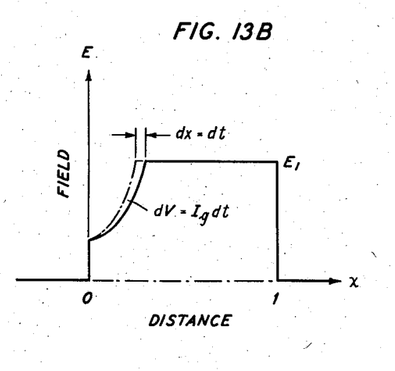

The physical meaning of Equations 47 and 48 is illustrated in Figs. 11 through 13. Fig. 11 shows $g(t)$. $g(t) = 0$ until $t=t_0$. $g(t)$ jumps at once to its maximum value at $t=t_0$ and thereafter declines to zero at $t=t_1$; the reason for this behavior is as follows. The amount of current generated is just that required to keep $E_0'$ at $E_g'$. During the interval $t_0$ to $t_1$, the maximum rate of voltage increase occurs at $t=t_0$. In the absence of current, $E_0'$ would also increase at its maximum rate at $t=t_0$. Hence the current must be generated at its maximum rate at $t=t_0$.

Fig. 12 shows $g(x,t) = g(t-x)$ vs. $x$ at a particular time between $t_0$ and $t_1$. The distribution at subsequent times is obtained simply by sliding the curve forward (the dashed part of the curve shows the part that will become real at later times—as the distribution moves to the right). The current $I_g(t)$ is the area under the real part of the curve from $x=0$ to $x=t-t_0$. Figs. 13A and 13B show how the current modifies the field distribution; the dashed line shows the field that would exist at the same voltage in the absence of current. Thus the current raises $E_1'$ and lowers $E_0'$.

Fig. 13A also brings out the physical meaning of Equation 47. Associated with the current is a drop in field equal to the total moving charge $I_g$. Thus, as the field distribution moves to the right with unit velocity, it makes the voltage decrease at a rate equal to $I_g$. This is shown in Fig. 13B which shows $E'$ vs. $x$ at time $t$ (dashed curve) and $E'$ vs. $x$ at a later time $t+dt$. $E_1'$ is the same in both cases. During the time $dt$, the voltage decreases by an amount equal to the area between the two curves. That area is equal to $dx = v\, dt = dt$ times the drop in field $I_g$. If $E_1'$ also changes in the time $dt$, it causes a change in voltage $dE_1' = dE_1$. The sum of the two effects gives Equation 47 directly.

Equations 47 and 48 together give a simple differential equation $$\frac{dI_g}{dt} - I_g = \frac{dV}{dt} \qquad (49)$$

for $I_g$ in terms of the applied voltage $V(t) = V_d + V_a \sin \omega t$. The standard solution is $$I_g(t) = \omega V_a e^t \int_{t_0}^t e^{-t'} \sin \omega t'\, dt' \qquad (50)$$

$$= \frac{\omega V_a}{1+\omega^2}[(\omega \sin \omega t - \cos \omega t) - e^{t-t_0}(\omega \sin \omega t_0 - \cos \omega t_0)]$$

$$= \frac{\omega V_a}{\sqrt{1+\omega^2}}[\sin(\omega t - \varphi) - e^{(t-t_0)} \sin(\omega t_0 - \varphi)]$$

where $\tan \varphi = 1/\omega = 2/3\pi$ (which makes $\varphi$ about 12 degrees). $I_g$ starts at zero at $t=t_0$ and increases to a maximum $I_m$ at $t=t_1$. $dI_g/dt = g(t)$ is a maximum at $t=t_0$ and decreases steadily to zero at $t=t_1$. $t_1$ is found as a function of $t_0$ by setting $dI_g/dt = 0$ at $t=t_1$; this gives $$\omega e^{t_0} \cos(\omega t_1 - \varphi) = e^{t_1} \sin(\omega t_0 - \varphi) \qquad (51)$$

Figure 14:
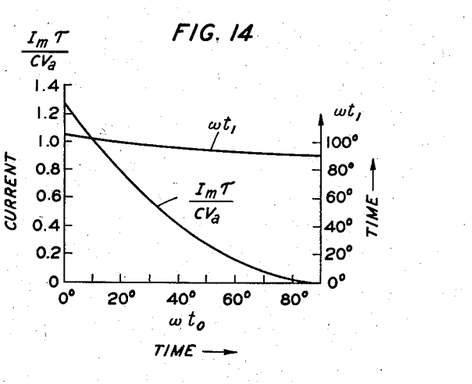
Fig. 14 is a plot of maximum current, $I_m$, and the time when field generation of charge carriers becomes negligible, $t_1$, vs. the time when field generation of charge carriers is initiated, $t_0$, for devices of the type shown in Figs. 3A, 4A, 5A, and 6A.

Fig. 14 gives a plot of $t_1$ and $I_m = I_g(t_1)$ vs. $t_0$. Figs. 15A and 15B show $I_g(t)$ vs. $t$ for several values of $t_0$; the curves extend into the second and third intervals of time, which are discussed next. The current in Figs. 14, 15A, and 15B is expressed by the dimensionless parameter $I\tau/CV_a$. Thus if $V_a$ is in volts, C in farads and $\tau$ in seconds, I will be in amperes.

(2) The second interval of time extends from $t_1$ to $t_0 + 1$. During this interval no current is generated. The distribution of charge $g(t-x)$ is moving unchanged through the space charge region. (All of the $g-t$ curve in Fig. 11 is real). The current $I_g$ remains constant and equal to $I_m$ (the maximum reached in the first interval). The leading edge of the pulse of electrons is at $$x = v(t-t_0) = t - t_0$$

Thus the leading edge reaches $x=w=1$ at $t=t_0+1$.

Figure 16:
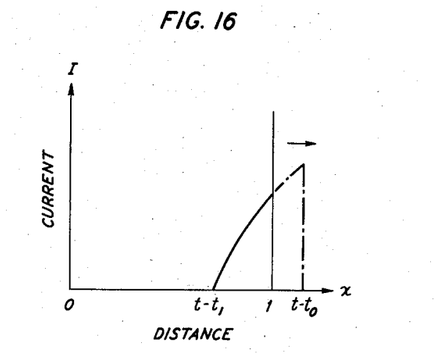
Fig. 16 is a curve showing the relationship of current to time and position at a particular time after the field generated current has begun to decrease.

(3) The third interval extends from $t=t_0+1$ until the time $t_1+1$, when all the charge has reached $x=1$. Thus during this interval $I_g$ decreases steadily from $I_m$ to zero. $I_g$ is equal to the total moving charge in the $v$ region; as charge flows out, $I_g$ decreases. The time $t_1$ varies with $t_0$ and is always slightly in the second quarter cycle. Specifically $\omega t_1$ varies (with $t_0$) between 90 and 102 degrees (see Fig. 14). Since the transit time corresponds to 270 degrees, current $I_g$ may flow until 12 degrees of the following cycle. We therefore confine the analysis to values of $t_0$ for which $\omega t_0$ is greater than 12 degrees (since we have assumed that no current is flowing at $x=1$ during the first interval). Fig. 16 shows $$I(x,t) = I(t-x) = g(t-x)$$

for a particular time during the third interval. Again the distribution for previous or subsequent times is obtained by moving the curve to the left or right. The area under the dashed part represents the charge that has already flowed out. Comparison with Fig. 12 shows that the charge which has flowed out at time $t$ is equal to $I_g(t-1)$. Thus $$I_g(t) = I_m - I_g(t-1) \qquad (52)$$

where $I_g(t-1)$ is found from Equation 50.

Figs. 15A and 15B show that, for a given maximum current $I_m$, the power delivered is greatest if $$\omega t_0 = \omega t_1 = \pi/2$$

However, $I_m$ is zero for $\omega t_0 = \pi/2$ and increases with $\pi/2 - \omega t_0$. Thus, there is an optimum $t_0$ that gives the maximum $P_g/P_i$.

First consider $P_g$.

$$P_g = \frac{\omega}{2\pi} \int_{t_0}^{t_1+1} I_g(t) V_a \sin \omega t\, dt \qquad (53)$$

In the first interval $I_g(t)$ is given by Equation 50. In the second interval $I_g(t) = I_m = I_g(t_1) = $ constant. In the third interval Equation 52 gives $I_g(t) = I_m - I_g(t-1)$. It is easy to verify that $$\int_{t_0+1}^{t_1+1} I(t-1) \sin (\omega t dt) = \int_{t_0}^{t_1} I(t) \cos \omega t\, dt \qquad (54)$$

From which $$P_g = \frac{3V_a}{4} \left[ \int_{t_0}^{t_1} I_g(t) \sin (\omega t - \pi/4)\, dt + I_m \int_{t_1}^{t_1+1} \sin \omega t\, dt \right] \qquad (55)$$

where $I_g(t)$ from $t_0$ to $t_1$ is given by Equation 50.

$I_g$ contributes to the imaginary (or 90 degrees out of phase power) $P_c$ a term that is the same as the right-hand side of Equation 55 except that $\cos \omega t$ replaces $\sin \omega t$. The current $I_c = dV/dt$ contributes a term $\tfrac{1}{2}\omega V_a^2$.

Figure 17:
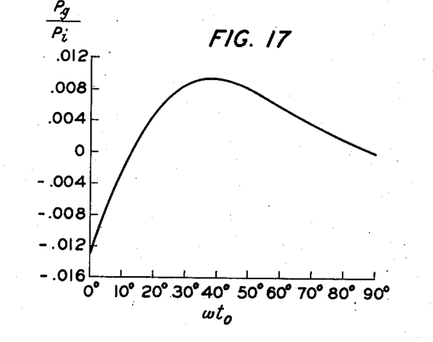
Fig. 17 is a plot of the ratio of the average power delivered, $P_g$, to the imaginary power, $P_i$, against the time in the period of the voltage applied to the devices of Figs. 3A, 4A, 5A, and 6A when the field generation of charge carriers is initiated.

Since $I_g$ is proportional to $V_a$, both $P_g$ and $P_i$ are proportional to $V_a^2$. Thus $P_g/P_i$ is uniquely determined by $t_0$. Fig. 17 is a plot of $P_g/P_i$ vs. $\omega t_0$; $\omega t_0$, in turn, is given by $V_a \sin \omega t_0 = V_g - V_d$ (Equation 39). $P_g/P_i$ vs. $\omega t_0$ has a broad flat maximum in the range of 35 to 40 degrees. It follows that the power delivered by the unit operating as a negative dynamic resistance reaches a maximum and thereafter decreases as the amplitude of applied voltage increases so that when employed in an oscillator the oscillations will build up to a stable amplitude. The magnitude of the maximum is about 0.01. Thus the unit when employed in an oscillator requires a microwave cavity with a Q of more than 100.

In discussing the efficiency of the disclosed devices the conditions under which, for the $p\nu n$ structure, current is generated only at $x=0$ will be considered. For the other structures, the sharp peak in field insures that current generation is localized at $x=0$. For the $p\nu n$ structure, it is sufficient to find the condition that the maximum field occur at $x=0$ at all times. Then when $E_0 = E_g$, current will be generated at $x=0$ but no current will be generated elsewhere since elsewhere $E < E_0 = E_g$. Poisson's Equation 18 shows that E is a maximum at $x=0$ if the maximum value of $I(x,t) = g(t-x)$ is less than or equal to $E_v$. We have already seen that $g(t_0)$ is the maximum value of $g$. Thus, the analysis will apply when $g(t_0) = E_v$. $g(t_0)$ is easily found from Equations 41 and 49. Since $I(1,t_0) = I_g(t_0) = 0$, Equation 41 and Equation 49 give $$g(t_0) = \omega V_a \cos \omega t_0 \qquad (56)$$

Thus $V_a$ must satisfy the inequality $$V_a < \frac{E_v}{\omega \cos \omega t_0} \qquad (57)$$

or using Equation 4

$$V_a < \frac{4V_v}{3\pi \cos \omega t_0} \qquad (58)$$

The efficiency $\epsilon$ of the device is the ratio of $P_g$ to the heat dissipated. If $P_d$ is the work done by the direct-current voltage per unit time, then the rate H of heat dissipation is $H = P_d - P_g$. The efficiency $\epsilon = P_g/H$ is thus $$\epsilon = \frac{P_g}{P_d - P_g} = \frac{1}{\frac{P_d}{P_g} - 1} \qquad (59)$$

$P_d$ is given by $$P_d = \frac{\omega}{2\pi} \int_{t_0}^{1+t_1} V_d I_g(t)\, dt \qquad (60)$$

We have already seen that, in the third interval $$(1 + t_0 < t < 1 + t_1)$$

$I_g(t) = I_m - I_g(t-1)$. Thus the average of $I_g(t)$ during the time that current is flowing is $I_m$ (this is seen graphically from the curves in Figs. 15A and 15B.) The average of $I_g$ for a cycle is then $\tfrac{3}{4} I_m$. So $$P_d = \tfrac{3}{4} I_m V_d \qquad (61)$$

Now consider the ration $P_d/P_g$ which determines the efficiency (Equation 59). $I_m$ is proportional to $V_a$ and $P_g$ to $V_a^2$. Thus $P_d/P_g$ equals $V_d/V_a$ times a function of $\omega t_0$. Therefore, from Equation 59 the quantity $$\frac{\epsilon}{1+\epsilon} \frac{V_d}{V_a}$$

is seen to be a function of $\omega t_0$. It is so plotted in Fig. 18. For a given ratio of $V_a$ to $V_d$, the efficiency increases as $\omega t_0$ increases. In other words, the efficiency increases as the $I_g$ vs. $t$ curve approaches a step function—the reason is evident from Figs. 15A and 15B.

The operating conditions for a given device are determined by the voltages $V_a$ and $V_d$. These are chosen as follows:

(1) To maximize the efficiency $V_a$ should be as large as possible. A theoretical upper limit on $V_a$ is set by the fact that the electrons should not slow down appreciably during the negative part of the alternating-current cycle, and reduce the work done by the electrons against the alternating-current field. To find the upper limit on $V_a$ would require a calculation that takes account of how $v$ varies with field outside of the Ryder range. In practice, the upper limit on $V_a$ will probably be set by the rate of heat dissipation as will be discussed later in this section.

(2) When $V_a$ has been chosen, $V_d$ is chosen so that $\omega t_0$ is somewhere between 40 degrees (where $P_g/P_i$ is a maximum) and 90 degrees (where $\epsilon$ is a maximum).

When the unit is used in a tuned microwave cavity as an oscillator, the bias $V_d$ can be varied as the oscillation built up: First $V_d$ is chosen to give the optimum small signal resistance R (Equations 11, 29 and Fig. 9); this means taking $V_d$ very near $V_g$. As the oscillation builds up ($V_a$ increases), $\omega t_0$ decreases (the voltage exceeds $V_g$ over an increasing fraction of the direct-current cycle) until $P_i/P_g$ is equal to the Q of the cavity. If the Q of the cavity is fixed, then $P_i/P_g$ and $\omega t_0$ are fixed. The amplitude of oscillation $V_a$ is then increased by decreasing the bias $V_d$—since $V_g - V_d = V_a \sin \omega t_0$. Thus the oscillation builds up to the desired amplitude.

Figure 19:
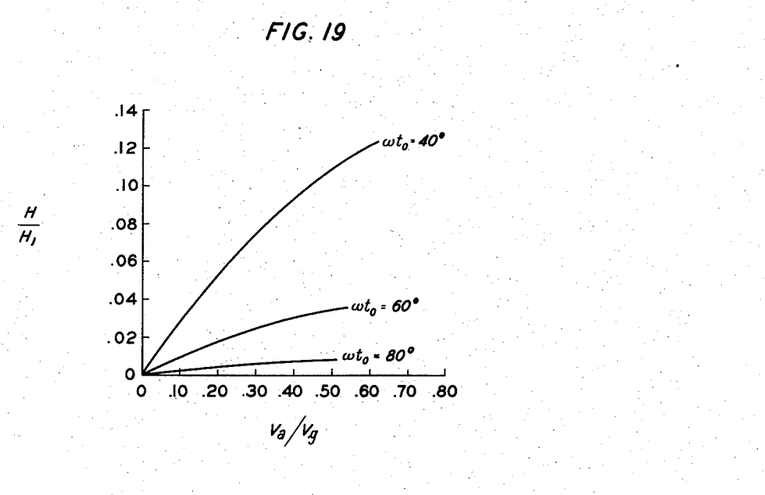
Fig. 19 is a plot of the ratio of heat generated per cycle to $H_1$ (as defined in Equation 62) against the ratio of applied signal voltage to the voltage of field generation of carriers for the negative dynamic resistances disclosed.

In practice the maximum amplitude is limited by the rate H of heat generation. The heat generated per cycle is the total work done by the sum of the alternating-current and direct-current voltages. Thus $H = P_d - P_g$. Fig. 19 is a plot of $H/H_1$ vs. $V_a/V_g$ for various values of $\omega t_0$, where $H_1$ in laboratory units is $$H_1 \text{ (in watts)} = \frac{C \text{ (in farads) } V_g^2 \text{ (in volts squared)}}{\tau \text{ (in seconds)}} \qquad (62)$$

Since $\omega t_0$ is determined by the Q of the cavity, the oscillation builds up along one of the curves in Fig. 19. $V_a$ will be determined by the bias $V_d$ (since $$V_g - V_d = V_a \sin \omega t_0)$$

The amplitude $V_a$ cannot become greater than $V_d$, so all the curves extend only to $V_d = V_a$—or $$V_g/V_a = 1 + \sin \omega t_0$$

Consider a negative dynamic resistance of the form shown in Fig. 3A, designed to operate at a frequency of 4000 megacycles. The transit time should then be $$\tau = \frac{3}{4 \times 4 \times 10^9} = 1.87 \times 10^{-10} \text{ seconds}$$

or 187 micro-microseconds. Extrapolating the available data on electron velocity to fields which are near $$E_g = 2 \times 10^5 \text{ volts/cm.}$$

indicates that $v$ is of the order of $10^7$ cm./sec. Thus the width of the space charge region is $$W_v = 1.87 \times 10^{-10} \times 10^7 = 1.87 \times 10^{-3} \text{ cm.}$$

or the order of one mil. The critical field for current generation is about $2 \times 10^5$ volts per cm. Taking $$E_v = \tfrac{1}{3} E_g$$

by proportioning the number of predominating or excess conductivity-type determining centers in the respective zones, the punch through voltage is $$V_p = \frac{1}{2} \frac{E_g}{3} W_v = \frac{2 \times 10^5 \times 1.87 \times 10^{-3}}{6} = 62 \text{ volts}$$

The critical voltage $V_g$ is then $$V_g = \tfrac{5}{6} E_g W_v = 310 \text{ volts}$$

For germanium, $$C = \frac{\eta}{4\pi W_v} = \frac{1.4 \times 10^{-12}}{W_v} = 7.5 \times 10^{-10} \text{ farads/cm.}^2$$

and $$N_v = \frac{CE_v}{q} = \frac{7.5 \times 10^{-10} \times 2 \times 10^5}{1.6 \times 10^{-19} \times 3} = 3.13 \times 10^{14} \text{ per cm.}^3$$

The corresponding room temperature resistivity is about six ohm-centimeters.

For a good small signal performance, as shown in Fig. 9, $r$ should be about 2.5. The resistance of the unit at the direct-current bias should therefore be, from Equation 29

$$R = \frac{3\pi}{2} \times 2.5 \times \frac{\tau}{C} = 11.8 \frac{\tau}{C}$$

$$= \frac{11.8 \times 1.87 \times 10^{-10}}{1.19 \times 10^{-9}} = 1.85 \text{ ohms cm.}^2$$

If the slope of the $\ln I_g$ vs. $\ln V$ curve is $m' = 25$ the direct-current current $I_d$ is given, from Equation 11 by $$I_d = \frac{V_g}{m'R} = \frac{310}{25 \times 1.85} = 6.71 \text{ amps./cm.}^2$$

The direct-current power would therefore be 2080 watts per cm.$^2$, or 20.8 watts in a one-square-mm. junction area.

Thus, a $p$-$\nu$-$n$ structure of the type shown in Fig. 3A having a low resistivity $p$ region as short as possible, for example about 0.5 mil long and 0.001 ohm-centimeter resistivity, a sharp step in resistivity to six ohm-centimeters material over a $\nu$ region length of $1.87 \times 10^{-3}$ centimeters and a second sharp step in resistivity to a short, low resistivity, for example about 0.5 mil long and of 0.001 ohm-centimeter resistivity, functions as a negative resistance at a frequency of 4000 megacycles. From Equation 62

$$H_1 = \frac{CV_g^2}{\tau} = \frac{7.5 \times 10^{-10} \times (310)^2}{1.87 \times 10^{-10}} = 38.5 \times 10^4 \text{ watts/cm.}^2$$

Since it is desirable that the unit be operated under conditions giving a maximum in the quantity $P_g/P_i$, from Fig. 17 $\omega t_0$ should be chosen as 40 degrees. The relationship between $V_g$ and $V_a$ can then be found from Equation 40

$$V_g = V_d + V_a \sin \omega t_0 = V_d + V_a \sin 40°$$
$$= V_d + V_a \cdot .7$$

Operating at a signal amplitude $V_a$ which is one-third of the bias voltage $$\frac{V_g}{V_a} = 3 + .7 = 3.7$$

$$\frac{V_a}{V_g} = .27$$

From Fig. 19 at $\omega t_0 = 40°$ and $$\frac{V_a}{V_g} = .27$$

the direct-current dissipation in the unit is $$H = .07 \times H_1$$
$$H = .07 \times 38.5 \times 10^4 = 2.5 \times 10^4 \text{ watts/cm.}^2$$

Figure 18:
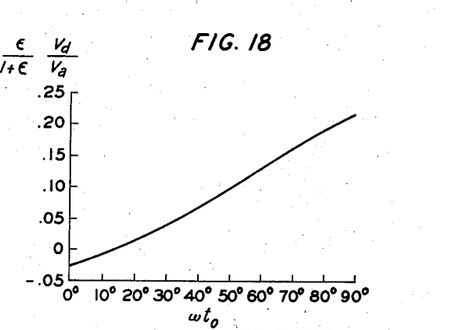

At $\omega t_0 = 40°$, from Fig. 18

$$\frac{\epsilon}{1+\epsilon} \frac{V_d}{V_a} = \frac{3\epsilon}{1+\epsilon} = .07$$

Since $\epsilon$ will be small, we may neglect it in the denominator and $$3\epsilon = .07$$
$$\epsilon = 2.3\%$$

and the signal power delivered will be $$\epsilon H = 575 \text{ watts/cm.}^2$$

The other suggested configurations and their counterparts, e.g., an $n$-$\pi$-$p$ structure is the counterpart of the $p$-$\nu$-$n$ structure, can also be designed to operate at a selected frequency by an analysis similar to that presented above. For example, a $p$-$n$-$i$-$n$ structure as shown in Fig. 4A can be arranged to operate as a negative dynamic resistance at 4000 megacycles at a considerably lower applied voltage than a device of the type discussed above. A device of this form can be arranged to have a drop in the field in the narrow $n$ region, $E_n$, which is ⅔ of the peak field, which is approximately $E_g$. At 4000 megacycles the space charge layer has a total width of $1.87 \times 10^{-3}$ centimeters as above. In a structure having a narrow $n$ layer adjacent the $p$ region, which is one-tenth of the total width or $.187 \times 10^{-3}$ centimeters, the critical voltage is 137 volts. The excess donor concentration in the narrow $n$ region must be 20 times the value of $N_v$ in the above case since it has to give twice the drop in field in one-tenth the distance. Thus $$N_n = 20 \times 3.13 \times 10^{14} = 6.26 \times 10^{15}$$

corresponding to a room temperature resistivity of about 0.3 ohm-centimeter.

A practical $p$-$n$-$i$-$n$ unit for operation at 4000 megacycles can be made up of short, low resistivity, end sections, an intermediate $n$ section $.187 \times 10^{-3}$ centimeters long and of 0.3 ohm-centimeter resistivity, and an intrinsic zone $1.66 \times 10^{-3}$ centimeters long.

It is to be understood that the above descriptions and analyses are merely illustrative of the structures, principles of operation, and applications of the present invention. The semiconductive body forms may be modified in a number of ways while utilizing the concepts of this invention, for example, the conductivity types in the respective zones of the devices and the applied bias polarities can be reversed so that negative dynamic resistance is effected by a phase shift in current resulting from the flow of field generated holes. Also, other geometries can be employed such as that employing a convergent flow of charge carriers from a large area source of field generated carriers to a smaller area collector at least partially surrounded by said source. This convergent geometry and its advantages in dynamic negative resistance devices is discussed in detail in W. Shockley's application Serial No. 333,449 of January 27, 1953. In accordance with the present invention this geometry can be applied with the arrangement of contiguous zones discussed herein modified in structure to a series of concentric cylinders, spheres, or hemispheres wherein the innermost zone is the collector and outer zone or zones contain successively the space charge region for the critical flow of charge and the field maximum constituting the localized source of field generated charge carriers. Numerous other arrangements may be devised by those skilled in the art without departing from the spirit and scope of the invention.

What is claimed is:

1. A high frequency negative resistance comprising a body of semiconductive material having portions of opposite conductivity type, a conductivity transition layer intermediate said portions, means for applying a reverse bias to said body to produce a space charge region encompassing said transition layer and means for applying an alternating signal to said body, the magnitude of the combined bias and signal in the bias aiding direction being sufficient to produce a maximum field greater than about 100,000 $(E_g/0.7)^{3/2}$ volts per centimeter where $E_g$ is the energy gap of the material at said layer in a localized portion of said space charge region, the transit time of the effective charge carriers from said layer to the edge of said space charge region being so correlated with the signal period that the integrated product of signal voltage and signal current is negative.

2. A high frequency negative resistance comprising a body of semiconductive material having a first portion of one conductivity type, a second portion of the conductivity type opposite that of said first portion and of high conductivity as compared to the conductivity of said first portion, a conductivity transition layer intermediate said portions, means for applying a reverse bias to said body to produce a space charge region encompassing said layer and extending principally into said first portion, and means for applying an alternating signal to said body, the magnitude of the combined bias and the signal in the bias aiding direction being sufficient to produce a localized maximum field in said space charge region in excess of the critical field for current generation, the distance from said localized field to the edge of the space charge region in said first body portion and the field in the space charge region being so correlated with the signal period that the integrated product of the signal voltage and signal current is negative.

3. A high frequency negative resistance comprising a body of semiconductive material having a first layer of high conductivity material of one conductivity type, a second layer of high conductivity material of the opposite conductivity type from that of said first layer, a third layer of low conductivity material contiguous with and intermediate said first and second layers, a rectifying junction intermediate said first and third layers, means for applying a reverse bias to said junction to produce a space charge region encompassing said junction and extending principally into said third layer, and means for applying an alternating signal to said body, the magnitude of the combined bias and signal in the bias aiding direction being sufficient to produce a localized maximum field adjacent said junction in excess of the critical field for current generation, the transit time of the effective charge carriers from said localized maximum field to the edge of said space charge region being so correlated with the signal period that the integrated product of signal voltage and signal current is negative.

4. A device in accordance with claim 3 wherein said third layer is of intrinsic material.

5. A device in accordance with claim 4 wherein said third layer is of low conductivity p-type material.

6. A device in accordance with claim 4 wherein said third layer is of low conductivity n-type material.

7. A high frequency negative resistance comprising a body of semiconductive material having a first layer of high conductivity material of one conductivity type, a second layer of high conductivity material of the opposite conductivity type from that of said first layer, a third layer having a width of the order of a mil of low conductivity material of the same type as said second layer contiguous with and intermediate said first and second layers, a rectifying junction intermediate said first and third layers, means for applying a reverse bias to said junction to produce a space charge region encompassing said junction and extending across said third layer throughout the operation of the device as a negative resistance, and means for applying an alternating signal to said body, the magnitude of the combined bias and signal in the bias aiding direction being sufficient to produce a field at said layer in excess of the critical field for current generation, the transit time of the effective charge carriers from said junction to the edge of said space charge region in said third layer being so correlated with the signal period that the integrated product of signal voltage and signal current is negative.

8. A combination having a negative dynamic resistance characteristic comprising a semiconductive body, a pair of electrical connections to said body, a rectifying barrier region intermediate said connections, a source of electrical potential connected across said connections having a polarity which biases said barrier in the reverse direction of conduction and a magnitude which maintains a space charge region of substantial width encompassing said barrier, and a source of alternating voltage connected across said connections of such magnitude when in the bias aiding direction that charge carriers are field generated in said rectifying barrier region and of such frequency that the transit time of the field generated charge carriers from said rectifying barrier region to an edge of said space charge region falls between $$\frac{n\pi}{\omega}$$

and $$\frac{(n+1)\pi}{\omega}$$

where $n$ is an odd integer and $\omega$ is the angular frequency of the alternating voltage.

9. A combination having a negative dynamic resistance characteristic comprising a semiconductive body, a pair of electrical connections to said body, a rectifying barrier region intermediate said connections, a low conductivity region of semiconductive material adjacent said barrier region, a source of electrical potential connected across said connections having a polarity which biases said barrier in the reverse direction of conduction and a magnitude which maintains a space charge region of substantially fixed width encompassing said barrier region and said low conductivity region and which maintains the field over a substantial portion of the width of the space charge region in the range where charge carrier velocity is substantially independent of field, and a source of alternating voltage connected across said connections of such magnitude when in the bias aiding direction that charge carriers are generated in said rectifying barrier region and of such frequency that the transit time of the field generated charge carriers from said point of maximum field to an edge of said space charge region falls between $$\frac{n\pi}{\omega}$$

and $$\frac{(n+1)\pi}{\omega}$$

where $n$ is an odd integer and $\omega$ is the angular frequency of the alternating voltage.

10. A combination having a negative dynamic resistance characteristic comprising a semiconductive body, a pair of electrical connections to said body, an n-p junction region in said body intermediate said connections, a first portion of said junction region containing a greater gradient in the concentration of conductivity type determining impurities than other portions of said body, a source of electrical potential connected across said connections having a polarity which biases said $n$ portion positive with respect to said $p$ portion and of a magnitude which maintains a space charge region encompassing said junction and maintains a field in a portion of the space charge region in the Ryder range, and a source of alternating voltage connected across said connections of such magnitude when in the bias aiding direction that charge carriers are field generated at said first portion of said junction region and of such frequency that the transit time of the field generated charge carriers from said first portion to an edge of said space charge region falls between $$\frac{n\pi}{\omega}$$

and $$\frac{(n+1)\pi}{\omega}$$

where $n$ is an odd integer and $\omega$ is the angular frequency of the alternating voltage.

11. A combination having a negative dynamic resistance characteristic comprising a semiconductive body, a pair of electrical connections to said body, an $n$-$p$ junction region intermediate said connections, a zone adjacent said junction region and intermediate said connections containing at least a near balance of acceptor and donor centers, a source of electrical potential connected across said connections having a polarity which biases said junction region in the reverse direction of conduction and a magnitude which extends said space charge region of said reverse biased junction region across said zone, and a source of alternating voltage connected across said connections of such magnitude when in the bias aiding direction that charge carriers are field generated in the vicinity of said junction and of such frequency that the transit time of the field generated charge carriers across said zone falls between $$\frac{n\pi}{\omega}$$

and $$\frac{(n+1)\pi}{\omega}$$

where $n$ is an odd integer and $\omega$ is the angular frequency of the alternating voltage.

12. A combination as defined in claim 11 wherein said zone is of intrinsic material.

13. A combination as defined in claim 11 wherein said zone is of a material containing a slight predominance of acceptor centers.

14. A combination in accordance with claim 11 wherein said zone contains a slight predominance of donor type centers.

References Cited in the file of this patent
UNITED STATES PATENTS

| | | |
|---|---|---|
| 2,589,704 | Kirkpatrick | Mar. 18, 1952 |
| 2,666,816 | Hunter | Jan. 19, 1954 |
| 2,694,112 | McKay | Nov. 9, 1952 |
| 2,778,956 | Dacey et al. | Jan. 22, 1957 |
| 2,794,917 | Shockley | June 4, 1957 |